United States Patent [19]

Liu

[11] Patent Number: 4,646,347

[45] Date of Patent: Feb. 24, 1987

[54] RINGING SIGNAL REFORMATTING CIRCUIT

[75] Inventor: Thomas C. Liu, Atlantic Highlands, N.J.

[73] Assignees: American Telephone and Telegraph Company, New York, N.Y.; AT&T Information Systems Inc., Holmdel, N.J.

[21] Appl. No.: 729,955

[22] Filed: May 2, 1985

[51] Int. Cl.⁴ .................................................. H04M 1/72
[52] U.S. Cl. ...................................... 379/375; 379/164
[58] Field of Search ................. 179/84 R, 84 T, 81 R, 179/84 VF, 84 SS, 99 R

[56] References Cited

U.S. PATENT DOCUMENTS

| | | | |
|---|---|---|---|
| 4,066,848 | 1/1978 | Darwood | 179/84 R |
| 4,184,053 | 1/1980 | Saneyoski | 179/84 R |
| 4,477,697 | 10/1984 | Judd et al. | 179/84 T |
| 4,508,937 | 4/1985 | Burger et al. | 179/84 T |
| 4,567,333 | 1/1986 | Embree et al. | 179/84 T |

*Primary Examiner*—James L. Dwyer
*Attorney, Agent, or Firm*—John A. Caccuro

[57] ABSTRACT

A ringing signal reformatting circuit detects ringing signals having one or more ringing bursts and generates a code representing a modified distinctive ringing signal having a predetermined number of bursts and a predetermined on/off timing in response to all detected ringing signals having the same number of ringing bursts. This coded ring signal is sent to a station set and decoded thereat to generate a distinctive ring signal.

12 Claims, 7 Drawing Figures

RING DATA WORD 201

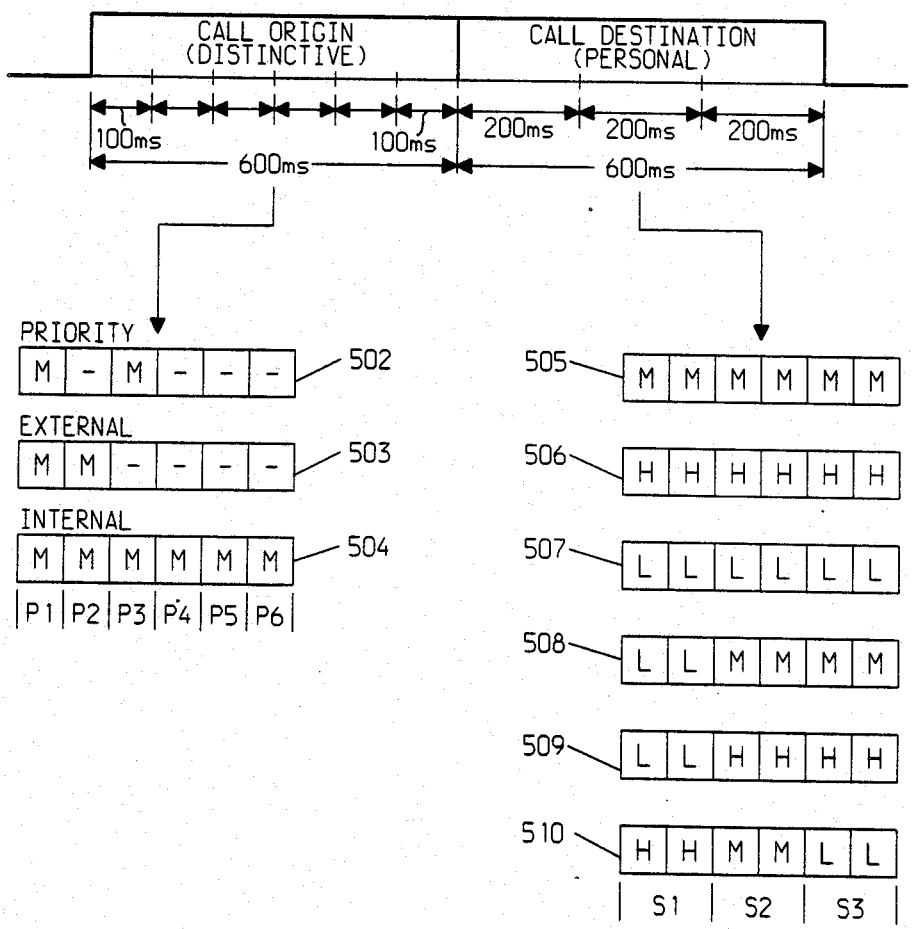

FIG. 6

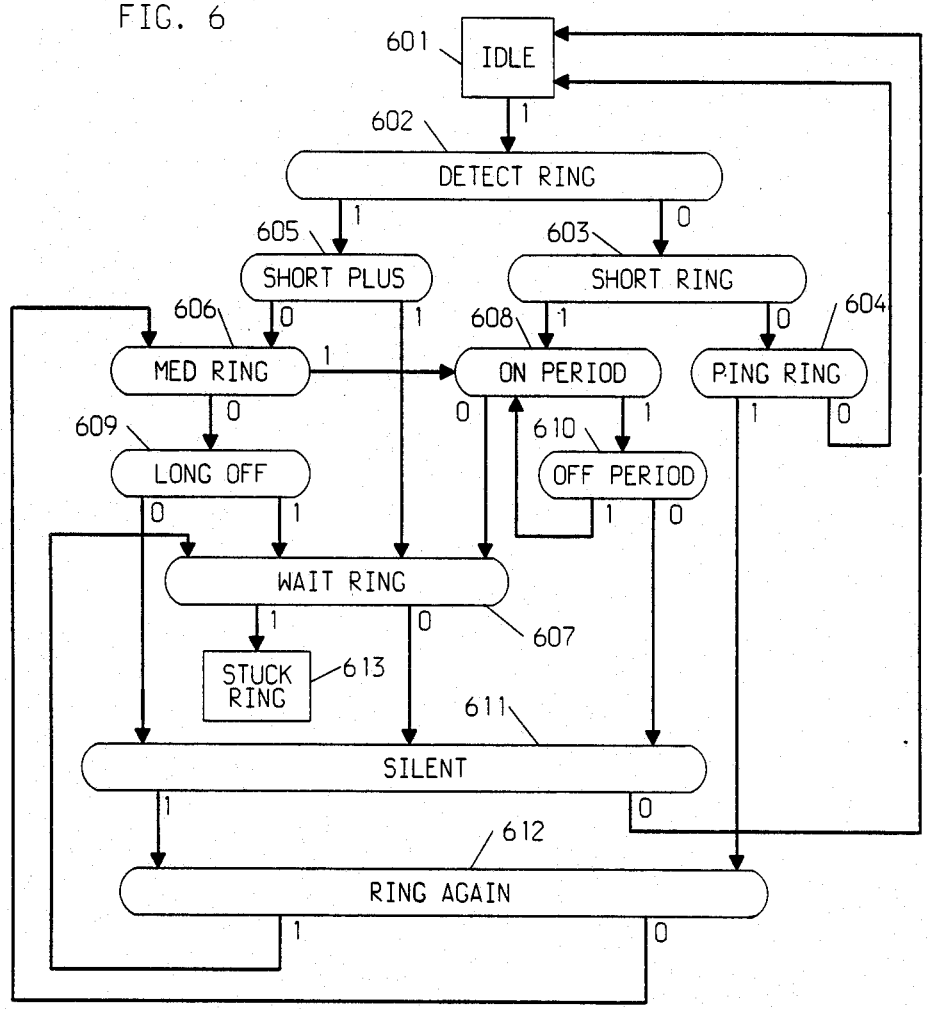

FIG. 7

| OLD STATE | LOOP CURRENT ABSENT | LOOP CURRENT PRESENT |
|---|---|---|
| DET RING | CLEAR BURST COUNT | CLEAR BURST COUNT |
| SHORT RING | NO ACTION | INCREMENT BURST COUNT |
| SHORT PLUS | NO ACTION | REPORT ONE-BURST RING |
| MED RING | NO ACTION | INCREMENT BURST COUNT |
| LONG OFF | REPORT ONE-BURST RING | REPORT SPECIAL RING |
| WAIT RING | NO ACTION | REPORT STUCK RING |
| ON PERIOD | NO ACTION | REPORT MULTI-BURST RING |
| OFF PERIOD | REPORT MULTI-BURST RING | INCREMENT BURST COUNT |
| SILENT | TERMINATE RINGING | CLEAR BURST COUNT |
| RING AGAIN | NO ACTION | REPORT ONE-BURST RING |
| PING RING | REPORT PING RING | REPORT ONE-BURST RING |

RINGING SIGNAL REFORMATTING CIRCUIT

FIELD OF THE INVENTION

This invention relates to telephone ringing signal circuits and more particularly to a circuit for reformatting distinctive ringing signals received from any one of several sources into a new predefined distinctive ringing signal format.

BACKGROUND OF THE INVENTION

Currently, many PBXs and central office (CO) Centrex systems provide distinctive ringing to enable a user to distinguish between calls originated by a caller internal to or external to the system. These distinctive ringing signals vary among PBXs and vary from those used with the Centrex systems. Similarly, many key telephone systems provide a personalized ringing feature to identify which party should answer an incoming call. These key telephone systems may also be utilized behind a private branch exchange (PBX) or CO Centrex system. In the prior art systems personalized ringing is provided together with distinctive ringing by detecting and passing through the envelope of the distinctive ringing signal and modulating different frequencies to produce the different ringing signals. However, this detection process involves repeatedly sampling each CO line to recover the distinctive ring signal and to pass this information on to the appropriate station(s). When the number of CO lines and stations increase this process becomes very time consuming for the system controller.

SUMMARY OF THE INVENTION

The apparatus and method of the present invention describes a ringing signal reformatting circuit which detects and distinguishes the received distinctive ringing signals and regenerates the information as a code representing the distinctive ringing signal in the format of the connected key telephone system (KTS). This distinctive ring signal code is sent to the appropriate station(s) once each ringing cycle and the station regenerates the distinctive ring signal therefrom. Since this distinctive ring signal code is set only once per ring cycle it requires little controller overhead. One illustrative embodiment of the present invention comprises a ringing signal detector and a regenerator for generating a code representing a modified ringing signal having a predetermined on/off timing in response to all detected ringing signals having the same number of ringing bursts.

BRIEF DESCRIPTION OF THE DRAWING

The characteristics and operation of the present invention will be more apparent from the following detailed description taken in conjunction with the drawing in which:

FIG. 4 shows the mapping of the Centrex and PBX ring signal into the KTS ring signal;

FIG. 5 shows an illustrative KTS ring signal incorporating the distinctive ring signal from a Centrex or PBX and the personal ring signal of the KTS;

FIG. 6 shows a state diagram useful in describing the present invention; and

FIG. 7 shows a table describing the effects of loop currents on the state diagram of FIG. 6.

DETAILED DESCRIPTION

Figure 1:
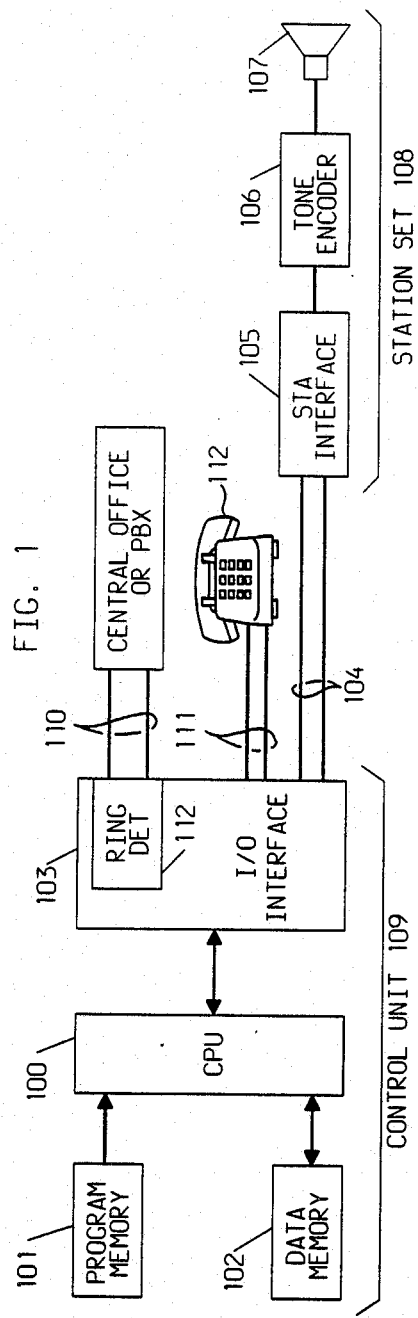
FIG. 1 is a block diagram of a telephone communication system useful for describing the present invention.

Shown in FIG. 1 is an illustrative block diagram of a key telephone system (KTS) useful for describing the operation of the present invention. The system includes common control unit 109 which connects to one or more central office (CO) or PBX lines, such as 110, and which connects to one or more station sets, such as 108 and 112, via facilities 104 and 111, respectively. Control unit 109 establishes and controls all intercom and CO or PBX line communications. Program memory 101 provides instructions to central processor unit (CPU) 100 for controlling the various operating features and functions of the system. Data memory 102 is utilized by the CPU for storing and accessing data associated with performing the various functions and features programmed in program memory 101. In the preferred embodiment CPU 100 is a microprocessor, program memory 101 is read-only-memory (ROM) and data memory 102 is random access memory (RAM). The input/output interface circuit 103 contains ring detector 112 as well as the well-known switching, network control, and line circuits required by the system to establish, maintain and terminate communications.

Station set 108 includes an interface 105, tone encoder 106, and speaker 107. The telephone handset and other well-known circuit and apparatus of station set 107 are part of interface 105 and operate in the conventional manner. Interface 105 also conditions the signals sent to and received over facility 104 from control unit 109 for use with tone encoder 106. Tone encoder 16 includes circuitry for converting binary (digital) ring data words received from common control unit 109 into a ringing signal which has been encoded with call origin (distinctive ringing) and call destination (personal ringing) information. Speaker or transducer 107 outputs the encoded ring signal to the user.

Figure 2:
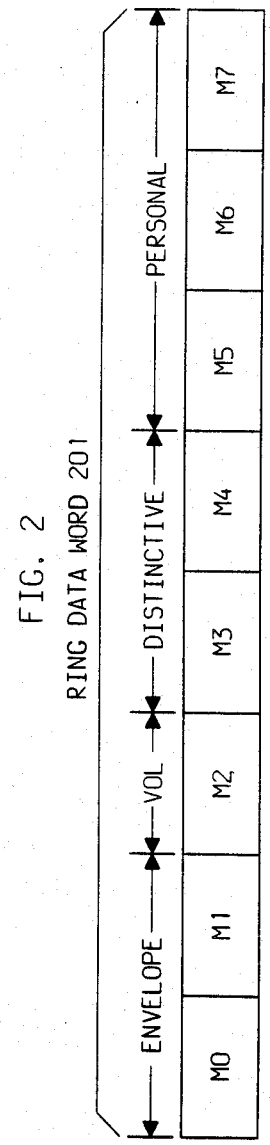
FIG. 2 shows a ring data word used by the communication system of FIG. 1 to convey ring signal information.

With joint reference to FIG. 1 and FIG. 2, control unit 109 is programmed in a straightforward manner to periodically generate binary ring data words 201 for transmission to a station set during the ringing mode. The data utilized to form ring data word 201 consists of data which is preprogrammed into program memory 101, programmed by the user into data memory 102, or determined by CPU 100 according to call characteristics. For example, control unit 109 is preprogrammed to generate the envelope bits M0 and M1 under certain call conditions. Similarly, by way of example, user programming determines the assignment of call destination (personal ringing) codes shown as suffix bits M5, M6 and M7. Finally, according to the present invention, CPU 100 receives and detects (FIG. 6) a distinctive ringing signal from a CO Centrex or PBX via loop 110 and reformats the information as the origin (distinctive ring) information segment of its own ringing signal. The distinctive ringing signal may indicate, for example, an internal, external, or high priority call of the CO Centrex or PBX system, which is appropriately encoded as the prefix information bits M3 and M4 of ring data word 201. Under program control, control unit 109 combines M3 and M4 with other data from tables, memory locations, and/or registers to format ring data word 201 for transmission to the appropriate station set. A detailed description of the method and circuitry for encoding telephone ringing signals is described in U.S. Pat. No. 4,477,697 issued to T. H. Judd et al on Oct. 16, 1984.

Ring detector 112 operates, in a well-known manner, to detect line ringing by sensing the existence of loop current (e.g., on loop 110) while the loop relay (not shown) is open. An off-hook or answer condition is detected when the loop relay is closed and loop current begins flowing. The abandonment of ringing (i.e., idle condition) is detected by the loss of loop current combined with an open loop relay condition lasting for a time period longer than any possible ringer-off period possible from a PBX or a CO. The status of the loop current (i.e., current present, current absent) and the loop relay (open, closed) are binary encoded and communicated to CPU 100 for processing.

Figure 3:
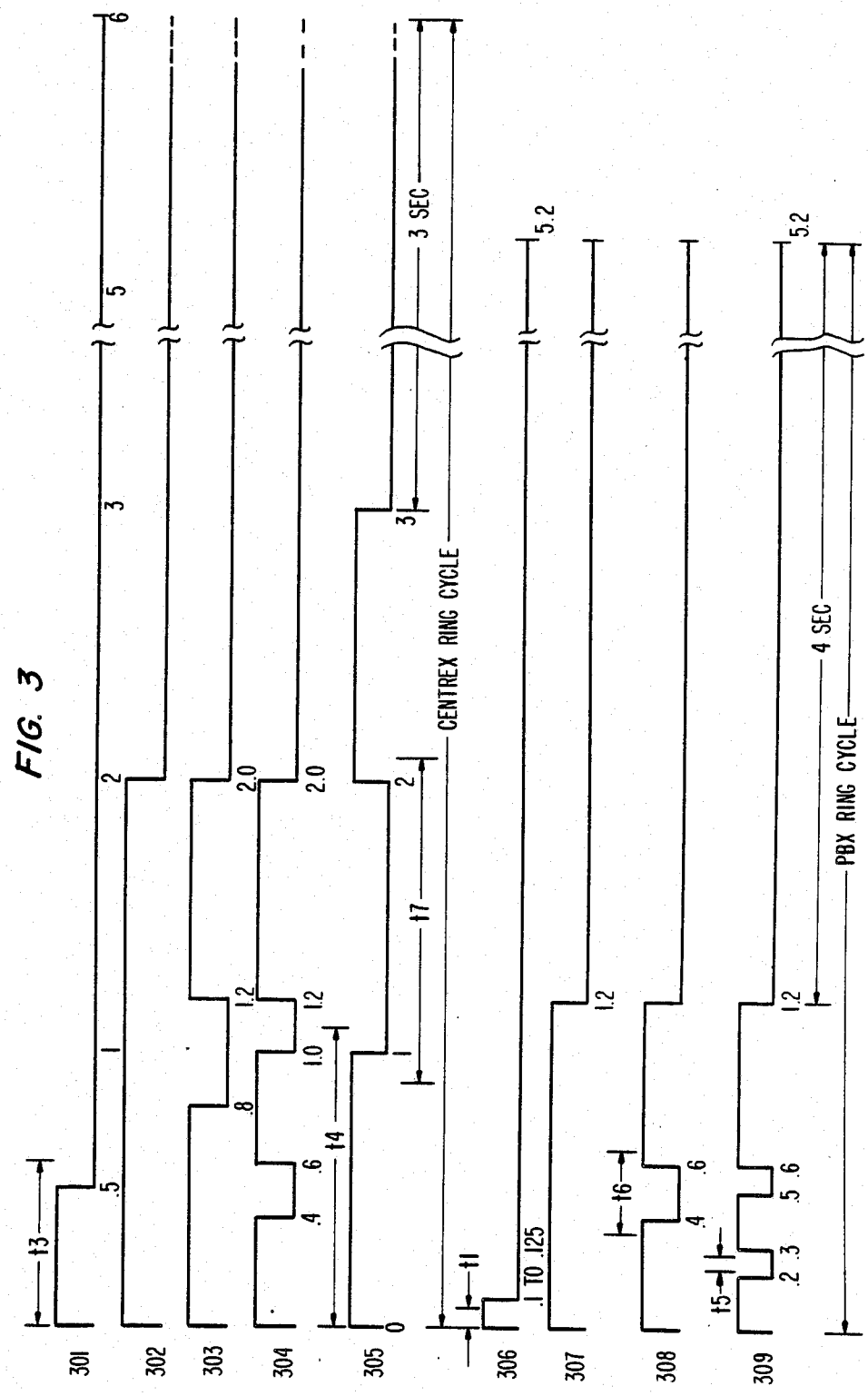
FIG. 3 shows different types of encoded distinctive ringing signal waveforms used with Centrex and PBX systems.

FIG. 3 illustrates typical CO Centrex and PBX ringing cycle signals which can be received by a KTS. The alerting signal cycle or interval will generally consist of several ringing cycles. Signals 301-305 represent rings of the various CO Centrex ring signals. Signal 301 represents the "ping" ring which is normally used to remind the user that a call has been forwarded. Signals 302-304 represent other types of call information such as external, internal and priority call, each cycle being 6 seconds long. Signal 305 represents alternative ring signal to ring signal 303. Similarly, signals 306-309 represent rings of the various PBX ring signals which can be received by a KTS. Signal 306 is a short single burst ring signal or a "ping" ring signal. Signals 307-309 represent the PBX equivalent to Centrex ring signals 302-304, but having each cycle 5.2 seconds.

Shown in FIG. 4 is the mapping of the Centrex and PBX ring signals of FIG. 3 into the locally generated KTS ring signal of FIG. 5 in accordance with the present invention. As shown in FIG. 5, the locally generated ring signal includes a prefix and a suffix segment. With reference to FIG. 4, as shown by 405, the "ping" ring signals 301, 306 are distinguished from other single burst ring signals and reformatted into a 600 ms long ring signal 504 without a suffix signal. When a "ping" ring signal is detected, control unit 108 disables the generation of the suffix segment of the ring signal. As shown by 401, the other single burst ring signals 302, 307 are reformatted into a long prefix signal 504 plus one of the suffix signals 505-510. As previously noted, the 600 ms long suffix portion is the "personal" ring code locally generated by the KTS. As shown in 402, the two burst ring signals 303, 305, 308 are reformatted as a short prefix signal 503 plus a suffix signal. In 403, the three burst ring signals 304, 309 are reformatted as a two-burst signal 502 plus a suffix signal. In 404, all ring signals having more than three bursts are also reformatted as long prefix signal 504 plus a suffix signal. As noted, the method and circuitry for generating the ring data words associated with the locally generated two segment ring signals illustrated, respectively, in FIG. 2 and FIG. 5 is described in the previously referenced Judd et al patent which description is incorporated by referenced herein.

In accordance with the present invention the Centrex and PBX ring signals are reformatted and mapped into the KTS ring signals using control unit 109 which is programmed to implement the distinctive ring detection state diagram shown in FIG. 6. Before proceeding with the operating description, it should be recognized that the present invention may be utilized in a variety of telephone communication systems. Since such systems utilize a variety of hardware and programming techniques, no attempt is made to describe the program used to control the communication system. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the state diagram of FIG. 6 which describes the logical steps and the various parameters required to implement the present invention.

With joint reference to FIGS. 1, 3, and 6, when no ring signal is received from Centrex or PBX over loop 110, the ring detect circuit 112 indicates an idle state 601 (i.e., no loop current and open loop relay) to CPU 100. The distinctive ring detection program which implements the state diagram of FIG. 6 is stored in program memory 101 and is called by CPU 100 to detect and interpret the distinctive ring signal conditions which appear on the CO or PBX loops (i.e., 110). After the distinctive ring signals are detected, control unit 109 generates the appropriate alerting tone, shown in FIG. 4, using the data format shown in FIG. 5.

In the following FIG. 6 description, the transitions between various states are governed both by the states of the loop current sense bit in hardware and by the elapsed time during which the hardware state is unchanged. Note that if at any time the loop relay closes, i.e., the call has been answered and, therefore, the ringing signal terminates, the operation of the distinctive ring detection program terminates (not shown in FIG. 6), allowing another program of the KTS to take control. Also, there are various actions taken at each FIG. 6 state transition; these are indicated in FIG. 7 as actions taken when the hardware state (loop current sense bit) remains in the same state for a specified amount of time.

Associated with the operation of FIG. 6 and FIG. 7 is a burst counter for keeping track of the number of ring bursts received. This burst counter is responsive to increment, clear and report commands for reporting the status to control unit 109. Moreover, certain operating states of FIG. 6 include a reporting function to apprise control unit 109 of the operating states of FIG. 6. These are listed in FIG. 7.

In the description of FIG. 6 that follows, if loop current exists, during an open loop relay condition, for a specified, predetermined period, a logic 1 exit from the present state results, and if loop current is absent for a specified, predetermined period, a logic 0 exit results, otherwise no exit occurs.

Thus, for example, the DET RING state (602) is entered when at least t1 ms of loop current has been detected during an open loop relay condition. If the loop current persists until t3 ms, the possibility of a "ping" ring (i.e., 301 or 306) is eliminated and the SHORT PLUS state 605 is entered. When, however, a ring signal greater than t1 and less than t3 ms is detected during an open loop relay condition, the SHORT RING state 603 is entered. If more than t8 ms of no loop current occurs following the t3 ms of loop current, a "ping" ring state 604 is verified. Where t8 is the maximum possible inter-ring burst time. If loop current returns within t8 ms then the second burst of a multi-burst ring has taken place and the ON PERIOD state 608 is entered.

In the SHORT PLUS state 605, if the beginning of ringing the loop current perists more than a total of t4 ms, the present invention assumes that a one-burst ring is detected (to optimize detection time) and the WAIT RING state 607 is entered. Otherwise, the MED RING state 606 is entered. During the MED RING state 606, if after the ring loop current ends it does not return within a total of t6 ms, the ring signal cannot be a multi-burst, but it can still be a one-burst (e.g., 302 or 307) or a Centrex special ring signal (e.g., 305). Under those circumstances, the LONG OFF state 609 is entered. If, however, loop current returns within t6 ms the ON PERIOD state 608 is entered.

Assuming the present invention has entered the LONG OFF state 609, if the no loop current condition lasts more than a total of t7 ms, this is a one-burst ringing and the SILENT state 611 is entered. If, however, loop current has returned within t7 ms, the signal is a Centrex special ring in which case the WAIT RING state 607 is entered. The LONG OFF state 609 distinguishes between the inter-burst interval of Centrex special ring and the inter-cycle interval of one burst ring signal.

Assuming the present invention has entered the ON PERIOD state 608, this indicates a ringer-on period, a ringing signal burst of a multi-burst ringing signal. If the loop current lasts longer than t4 ms, the allowable duration for any burst in a multi-burst ring to speed up detection the assumption is made that this is the final burst of a multi-bursting ringing signal and the WAIT RING state 607 is entered. Otherwise, the CPU must wait in the OFF PERIOD state 610 to determine whether the end of the ringing cycle has occurred.

The OFF PERIOD state 610 distinguishes between the inter-burst and the inter-cycle intervals of ring signals. During the OFF PERIOD state 610, if the maximum off period of t6 ms is reached, this ring cycle terminates and the SILENT state 611 is entered. Otherwise, if within t6 ms another ring burst is received the ON PERIOD state 610 is again entered.

The SILENT state 611 distinguishes between the absence of loop current during the inter-cycle interval and idle condition. During the SILENT state 611 if the loop current returns within the allowable silent period of t8 ms, the RING AGAIN state 612 is entered and another ring cycle starts. If loop current does not return within t8 ms this line has stopped ringing and control returns to idle state 601.

During the RING AGAIN state 612 when the next ring burst is received and MED RING state 606 is entered. If the ring period is greater than t4 ms, the signal must be a one-burst ring signal (e.g., 302 or 307) and a one-burst ring signal is reported. The CPU then waits in the WAIT RING state 607.

When in the WAIT RING state 607, the CPU is waiting for a ring cycle to terminate (i.e., when an absence of loop current for more than t5 ms takes place). When the ring cycle terminates the SILENT state 611 is entered.

Note, the IDLE state 601 and the STUCK RING state 613 are non-essential states. They represent states of an existing KTS which has been modified to incorporate the present invention. The IDLE state 601 is essentially the SILENT state 611 where there is no ringing or alerting signal present and no active call in progress. The STUCK RING state 613 is essentially the WAIT RING state 607 where a possible hardware or line problem exists causing the ringing signal to be stuck in the on condition (i.e., when loop current lasts more than t9).

In the state diagram of FIG. 6 the ON PERIOD state 608 represents ringing bursts in the ringing signal. The OFF PERIOD state 610 represents inter-burst interval. The SILENT state 611 represents an inter-cycle interval, i.e., the time between the last ringing burst of a ringing cycle and the first ringing burst of the next ringing cycle. The WAIT RING 607, MED RING 606 and LONG OFF 609 states enable improved detection time.

The key timing parameters for the state machine are:

Minimum first ring=t1 ms
   This is a minimum duration of the hardware ringing state (loop current present with an open loop relay) before the line ringing state is said to be entered.

Minimum ring burst=t2 ms
   The minimum duration of hardware ringing state for ascertaining the presence of ringing signal, except for the initial ringing cycle (so that the sort "ping" rings can be detected). Not shown in FIG. 3.

Maximum ping ring=t3 ms
   The maximum duration of ping rings (301,306).

Maximum ring burst=t4 ms
   The maximum duration for any burst of ring. Anything longer is treated as the final burst of a multi-burst rings, or as a one-burst ring if this burst is the first in the cycle.

Minimum off period=t5 ms
   This is the minimum duration for ringer off period.

Maximum off period=t6 ms
   The maximum inter-burst off period before the silent interval of a ringing cycle is said to be detected, except for the Centrex special rings.

Maximum long off=t7 ms
   The maximum allowable interburst off period after the initial ring burst for the Centrex special ring.

Maximum silence=t8 ms
   This is the maximum allowable inter-cycle silence period. (Not shown on FIG. 3) Anything longer is detected as the termination of the current line alerting.

Maximum ring=t9 ms
   This is the maximum duration for any hardware ringing state - when exceeded, there must be some problems from the hardware or the line, and is reported thus. Not shown on FIG. 3.

What has been described is merely illustrative of the application of the principles of the present invention. Other methods and circuits can be implemented by those skilled in the art without departing from the spirit and scope of the present invention.

What is claimed is:

1. A method of operating a ringing signal reformatter comprising the steps of:
   detecting ringing signals having one or more ringing bursts,
   counting the number of ringing bursts in the detected ringing signal, and
   generating a code representing a modified ringing signal having a predetermined number of bursts and a predetermined on/off timing in response to all detected ringing signals having the same number of ringing bursts.

2. The method of claim 1 wherein said generating step includes the steps of:

segmenting a locally generated ringing signal into two time segments, and mapping said modified ringing signal code into said first time segment.

3. The method of claim 2 wherein said generating step includes the step of:

enabling and disabling said second segment of said locally generated ringing signal in response to said detecting step.

4. The method of claim 3 wherein said detecting step includes the step of:

distinguishing between a first and a second type of single burst ringing signal having different signal duration and said enabling and disabling step is responsive to said distinguishing step for enabling the generation of said second segment of said locally generated ringing signal for said first type of single burst ringing signal and disabling said second segment for said second type of single burst ringing signal.

5. The ringing signal reformatter of claim 4 wherein said detecting step includes the steps of:

timing for the existence of said ringing burst which exceeds a predetermined minimum time period t1 and which is less than a predetermined maximum time period t3, and timing when said ringing burst satisfying said ringing burst timing step is followed by the absence of ringing for a time period of at least t8.

6. The method of claim 1 wherein said detecting step includes the steps of:

detecting a ringing signal burst interval and detecting an inter-burst interval.

7. The method of claim 6 wherein said burst interval detecting and said inter-burst interval detecting steps utilize different time periods depending on the type of ringing signals being detected.

8. The method claim 1 wherein said detecting step includes the steps of:

timing the absence of said ringing signal between ringing signal bursts, and distinguishing the absence of said ringing signal during an inter-burst interval from the absence of said ringing signal during an inter-cycle interval.

9. The method of claim 8 wherein said detecting step further includes the steps of:

timing the absence of said ringing signal and distinguishing between an inter-cycle interval and an idle condition when the absence of ringing signal exceeds predetermined time period t8.

10. A ringing signal reformatter comprising means for detecting ringing signals having one or more ringing bursts, means for counting the number of ringing bursts in the detected ringing signal, and means for generating a code representing a modified ringing signal having a predetermined number of bursts and a predetermined on/off timing in response to all detected ringing signals having the same number of ringing bursts.

11. The ringing signal reformatter of claim 10 wherein said generating means includes means for mapping said modified ringing signal into a first time segment of a two segment locally generated ringing signal.

12. The ringing signal reformatter of claim 11 wherein said generating means further includes means for enabling and disabling a second segment of said locally generated ringing signal.

* * * * *